United States Patent [19]

Dick

[11] 4,306,276
[45] Dec. 15, 1981

[54] MOTOR VEHICLE FLASHING LAMP AND HEADLAMP FIXTURE

[75] Inventor: Heinz Dick, Odenthal, Fed. Rep. of Germany

[73] Assignee: Ford Motor Company, Dearborn, Mich.

[21] Appl. No.: 71,636

[22] Filed: Aug. 31, 1979

[30] Foreign Application Priority Data

Nov. 4, 1978 [DE] Fed. Rep. of Germany ...... 2847908

[51] Int. Cl.³ .............................................. B60Q 1/06
[52] U.S. Cl. ........................................ 362/66; 362/80;
362/273; 362/287; 362/289; 362/421; 362/272;
362/286
[58] Field of Search ................ 362/80, 66, 64, 83,
362/270, 273, 275, 285, 287, 289, 414, 421, 272,
286

[56] References Cited

U.S. PATENT DOCUMENTS

| 3,809,880 | 5/1974 | Daumueller et al. | 362/80 |
| 4,188,655 | 2/1980 | Tallon et al. | 362/80 |
| 4,196,459 | 4/1978 | Dick | 362/80 |

FOREIGN PATENT DOCUMENTS

| 1217810 | 5/1966 | Fed. Rep. of Germany | 362/80 |
| 2626814 | 12/1976 | Fed. Rep. of Germany | 362/80 |
| 2656755 | 6/1978 | Fed. Rep. of Germany | 362/80 |
| 2743745 | 4/1979 | Fed. Rep. of Germany | 362/80 |
| 2351350 | 12/1977 | France | 362/80 |

Primary Examiner—Teddy S. Gron
Attorney, Agent, or Firm—John J. Roethel; Clifford L. Sadler

[57] ABSTRACT

This specification discloses a motor vehicle flashing lamp and headlamp fixture to be attached to a motor vehicle body. The fixture provides a pivotable mouunting so that the flashing lamp and the headlamp can be aligned with respect to each other as well as the automobile body while maintaining a simple and relatively secure mounting. The mounting of the flashing lamps and headlamps in a body aperture of the motor vehicle includes a headlamp braced by an upper swivel providing an upper swivel point for the headlamp relative to the flashing lamp. An outer lateral lower adjusting device, movable forward and backward for the illumination range adjustment, is attached through a bracket to the flashing lamp or the body. An inner lateral upper adjusting device, which is movable forward and backward for the illumination direction adjustment, is attached to the body. A mounting part for anchoring the flashing lamp to the body is constructed directly as a seat for the bearing part included in the swivel providing the upper swivel point for the headlamp.

7 Claims, 9 Drawing Figures

MOTOR VEHICLE FLASHING LAMP AND HEADLAMP FIXTURE

BACKGROUND OF THE INVENTION

1. Field of the Invention

The invention relates to a motor vehicle flashing lamp and headlamp fixture.

2. Prior Art

The prior art teaches various means for adjustment of the mounting of a headlamp in accordance with technical illumination requirements and aligning a lamp unit, including the headlamp and a flashing lamp or indicator, in a body aperture accommodating the lamp unit. The prior art further teaches, in the case of different headlamp constructions, solutions in order to realign mutually deviations of adjacent contours dictated on the one hand by production tolerances of the two lamps and on the other hand by production tolerances of the body hole accommodating the unit. Advantageously, this is done in such a way that a stylistically favorable appearance of the lamp unit arranged in the body aperture is obtained.

In the case of the known headlamp/flashing lamp fixtures these solutions consisted principally in the fact that the flashing lamp was constructed as a component engageable with or elastically attached to the headlamp. This preassembled unit was then anchored to the body through the intermediary of the conventional mounting devices for the respective headlamp construction.

The mutual alignment of the two headlamps could be achieved comparatively well in this case, however the alignment of the flashing lamp with reference to the mudguard more particularly in the case of headlamp constructions with a cover disc firmly attached to the reflector, the mobility of the cover disc which was necessary in order to align the headlamp in accordance with the technical lighting requirements could not always be obtained satisfactorily. Furthermore, the mounting of the flashing lamp was not always satisfactorily secure. These are some of the problems this invention overcomes.

SUMMARY OF THE INVENTION

The aim of the invention is to improve a mode of mounting flashing lamps and headlamps in motor vehicle bodies so that on the one hand a favorable mutual alignment of the two lamps, and on the other hand a favorable alignment of the flashing lamps with reference to the mudguard is possible and simultaneously a simple and reliably secure mode of mounting the two lamps to the body is achieved.

This aim is achieved according to the invention in that a mode of mounting flashing lamps and headlamps in a body aperture of a motor vehicle body includes a headlamp braced by a swivel means providing an upper swivel point for the headlamp against the flashing lamp housing. An outer lateral lower adjusting device, movable forward and backward for the illumination range adjustment, is attached through a bracket to the flashing lamp housing or to the body. An inner lateral upper adjusting device, which is movable forward and backward for the illumination direction adjustment, is attached to the body. A mounting part for anchoring the flashing lamp to the body is constructed directly as a seat for the bearing part included in the swivel means providing the upper swivel point of the headlamp.

Advantageously, if desired, the outer lateral lower adjusting device, movable forwards and backwards for the illumination range adjustment, is attached to the body through a guide bracket slidable on the flashing lamp housing. Also, the mounting part in the form of a screw bolt may be utilized for tensioning the support arm of the flashing lamp housing against a flange of the body. The free end of the screw bolt includes a first mating means such as a ball head or a ball socket to receive a coacting second mating bearing means portion of the swivel means providing the upper swivel point of the headlamp.

Due to the fact that a mounting part for anchoring the flashing lamp housing to the body is constructed directly as a seat for the second mating bearing means of the swivel means for the headlamp, a reliably secure mode of attaching the flashing lamp and the mounting point of the headlamp is achieved and furthermore a mutual alignment of the two lamps within close tolerances is ensured. Because the guide bracket is accommodated slidably on the flashing lamp for the adjusting device for the illumination range adjustment, good alignment of the two lamps mutually and between the mounting means of the headlamp to the body is ensured.

The bearing part of the swivel means for of the headlamp may in this case according to a further embodiment of the invention be removed inside the headlamp, whereby the horizontal pivotal axis of the headlamp is shifted more to its center of gravity lying farther forward due to the heavy diffuser or lens and a more vibration-free and more reliable support of the headlamp on the body can thereby be achieved.

BRIEF DESCRIPTION OF THE DRAWINGS

FIG. 5 shows an elevation in the direction of the arrow V in FIG. 3;

DETAILED DESCRIPTION

Figure 1:
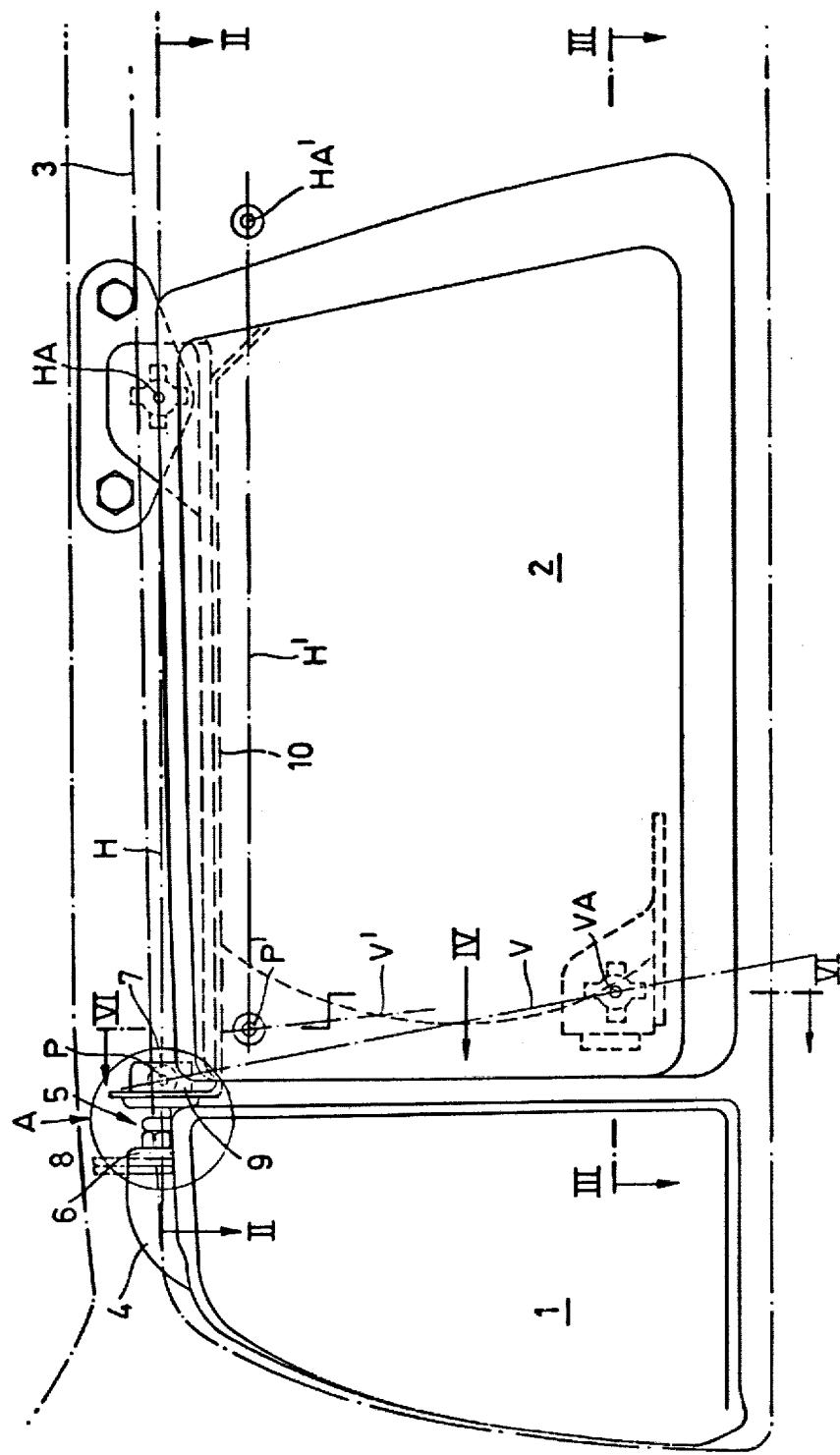
FIG. 1 shows an elevation of a flashing lamp and headlamp arrangement with the indicated adjacent components forming the body hole, with the fixing means according to the invention and optical pivotal axes of the headlamp marked in chain dotted lines.
Figure 2:
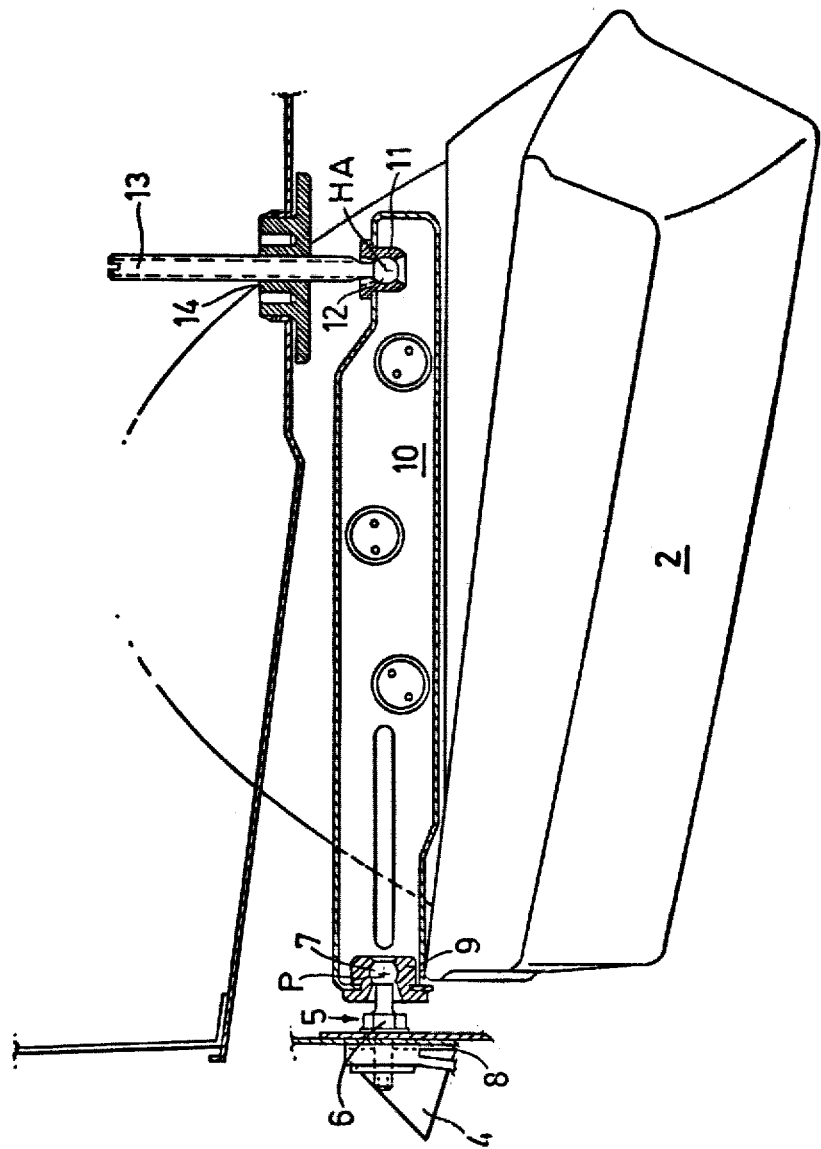
FIG. 2 shows a horizontal section along the line II—II in FIG. 1.
Figure 4:
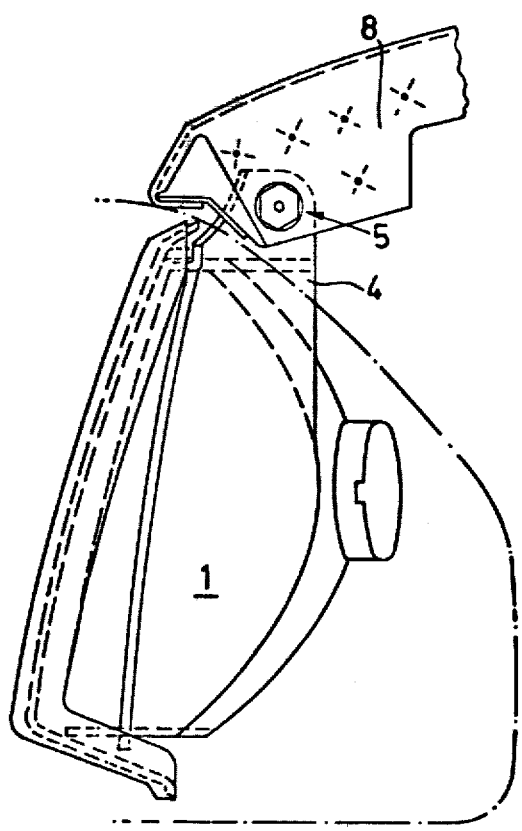
FIG. 4 shows an elevation in the direction of the arrow IV in FIG. 1.

In FIG. 1 a flashing lamp 1 and a headlamp 2 are arranged within a body aperture 3 indicated by thin chain-dotted lines. The housing of flashing lamp 1 is provided with an arm 4 which is attached through a mounting part 5 in the form of a screw bolt 6 with a ball head 7 to a flange 8 of the body (see FIGS. 2 and 4).

Ball head 7 constitutes the seat part of an upper pivotally movable mounting point P through which both the horizontal optical axis H (extending through the inner lateral upper forwards and backwards movable adjusting points HA) and also the vertical optical axis V of headlamp 2 (extending to the outer lateral lower forwards and backwards movable adjusting point VA) both extend.

A ball socket 9 made of plastic constitutes the bearing part of the swivel forming upper swivel point P in this case. Ball socket 9 is inserted into a holding part 10 which is firmly attached to headlamp 2. Holding part 10 accommodates a ball head 12 of an adjusting screw 13 which is mounted in a plastics bracket 14 on the body. This arrangement constitutes the adjusting device for the upper adjusting point HA that provides for the illumination direction adjustment (see FIG. 2).

Figure 3:
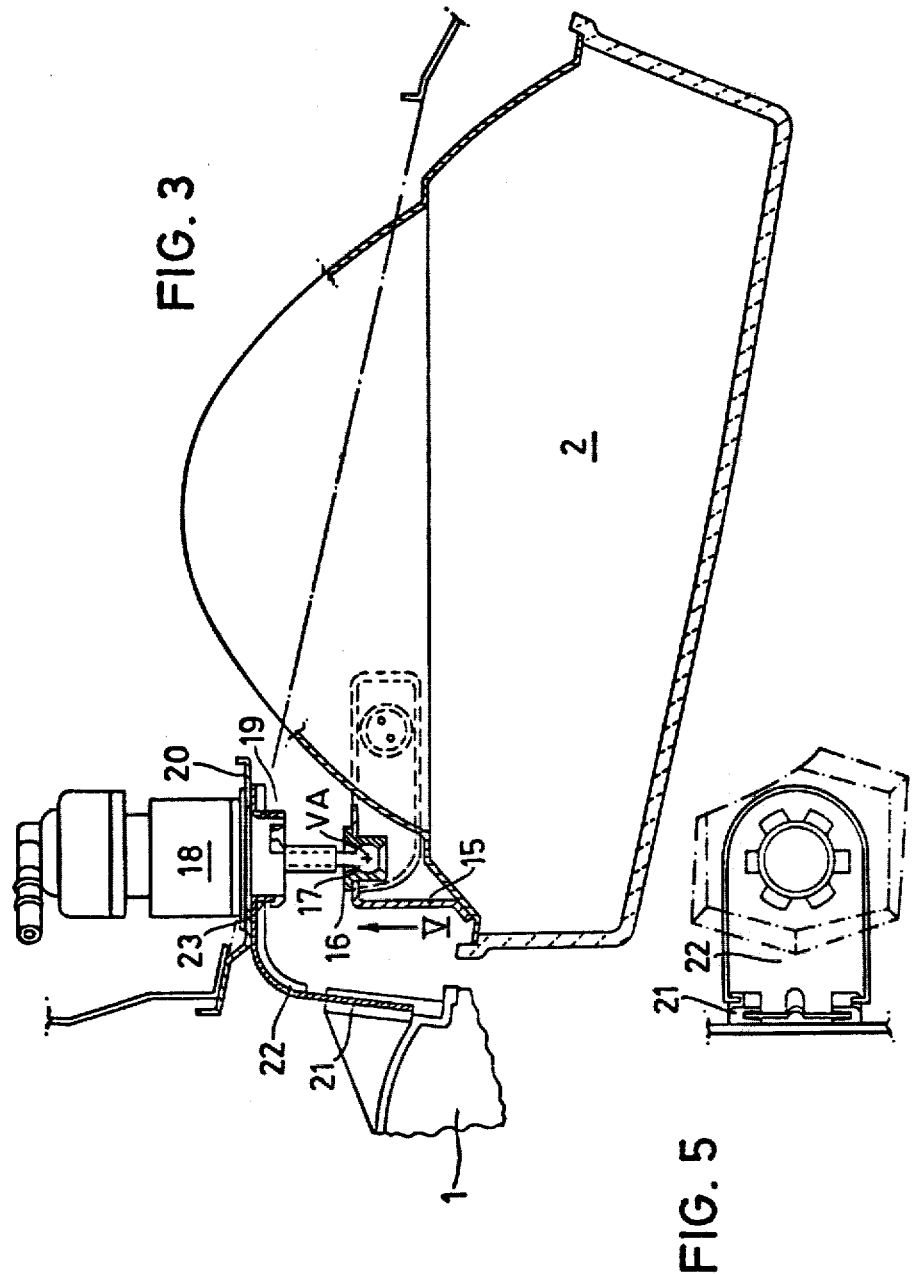
FIG. 3 shows a horizontal section along the line III-—III in FIG. 1.

A further holding part 15 is firmly attached to headlamp 2 in the region of the lower adjusting point VA. Holding part 15 again accommodates a ball socket 16 made of plastic in which the ball head 17 of, for example, an hydraulic illumination range adjusting device 18 is seated. Illumination range adjusting device 18 is fixed through a kind of bayonet catch 19 to a flange 20 of the body. In order that the mounting of illumination range adjusting means 18 occurs in coordination with the position of flashing lamp 1, flashing lamp 1 is provided with a guide means 21 in which a guide bracket 22 is slidingly accommodated, the angled end of which carries the catch orifice 23 for bayonet catch 19. The orifice in the flange 20 is made larger so that the position of illumination range adjusting device 18 is determined by the guide bracket 22 and illumination range adjusting device 18 is only attached to flange 20 of the body by the engagement of bayonet catch 19 (see FIGS. 3 and 5).

The mounting of flashing lamp 1 and of headlamp 2 is thus effected through a common mounting part 5, whereby on the one hand production and assembly cost are economized and on the other hand an alignment of the two adjacent components so as to permit close tolerances is ensured. Guide bracket 22 slidable on flashing lamp 1 ensures an appropriate determination of the position of the lower adjusting point VA, without it then being necessary for flashing lamp 1 to support the weight of illumination range adjuster 18, since the latter is supported by flange 20 of the body. In this way, no reinforcement of the flashing lamp in order to perform the guidance function for illumination range adjuster 18 is necessary.

The exemplary embodiment of the invention illustrated in FIGS. 1 through 5 starts from a mode of mounting flashing lamp and headlamps where the two components are attached to a flange 8 of the body oriented substantially in the longitudinal direction of the vehicle and vertically.

Figure 6:
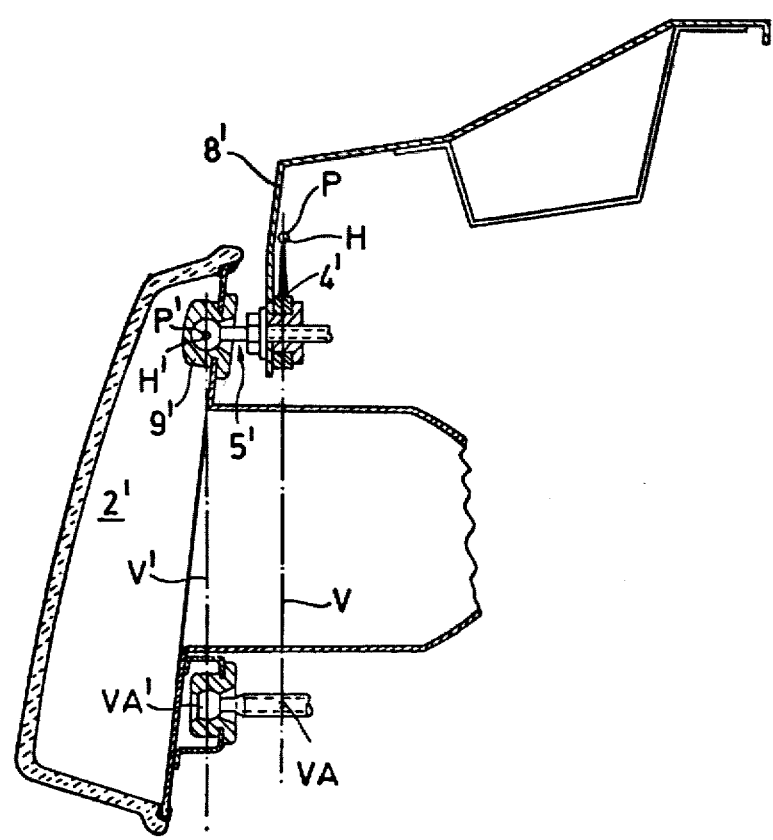
FIG. 6 shows a vertical section made along the line VIVI in FIG. 1.

However, this is not the only possible embodiment. On the contrary, as is shown, for example, in FIG. 6, a joint mounting of flashing lamp 1 and headlamp 2' can also be made to a flange 8' of the body extending in the transverse direction of the vehicle and vertically. In this case, a mounting means 5' extends in the longitudinal direction of the vehicle in contradistinction to the first exemplary embodiment. This second embodiment makes possible in a particularly advantageous manner the arrangement of the upper pivotally movable mounting point P' within the headlamp 2', whereby the horizontal optical axis H' and also the vertical optical axis V' can be removed nearer to the center of gravity of the headlamp 2', which lies comparatively far forwards in the case of the currently customary constructions of the diffusers or lens shown as a solid line around headlamp 2 (See FIG. 2).

Consequently, a more vibration-free and reliable mounting of the headlamp to the body can be achieved. As may be seen from FIG. 1, in this case the upper pivotally movable point P' can be arranged in a plane end region of the rectangular headlamp, where it scarcely has any prejudicial effect upon the optical requirements of the reflector configuration.

The ball socket 9' made of plastic may in this case be of closed construction at its end located in the headlamp 2' and be inserted sealed into the sheet metal of the reflector of the headlamp.

Figure 7:
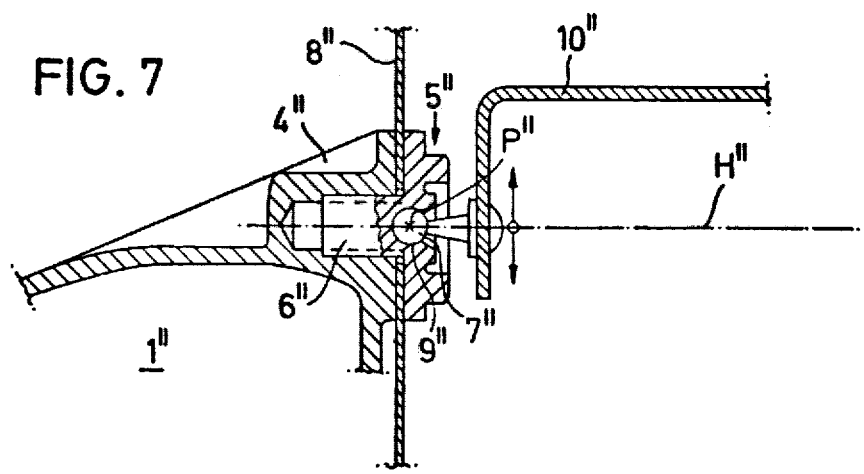
FIG. 7 shows a section through another embodiment of the mounting means shown in the circle A in FIG. 1.

The construction of mounting part 5, as shown in the circle A in FIG. 1, can be made in a further embodiment which is shown in FIG. 7. In this figure a flashing lamp 1' is attached through an arm 4" and a mounting part 5" to a flange 8" of the body. Mounting part 5" exhibits a screw bolt 6" in the free end of which a ball socket 9" is made which accommodates a ball head 7" of the upper pivotally movable mounting point P". The mounting part 5" in this case may be made of a suitable plastic material in which the ball socket 9" is shaped. The ball head 7" may be attached to an angled region of a supporting part 10" in such a way that a forward removal of the horizontal optical axis H" is optionally achieved.

Figure 8:
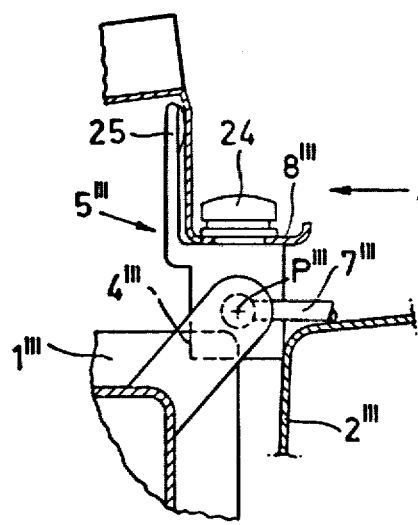
FIG. 8 shows an elevation of a further embodiment of the mounting means shown in the circle A in FIG. 1.
Figure 9:
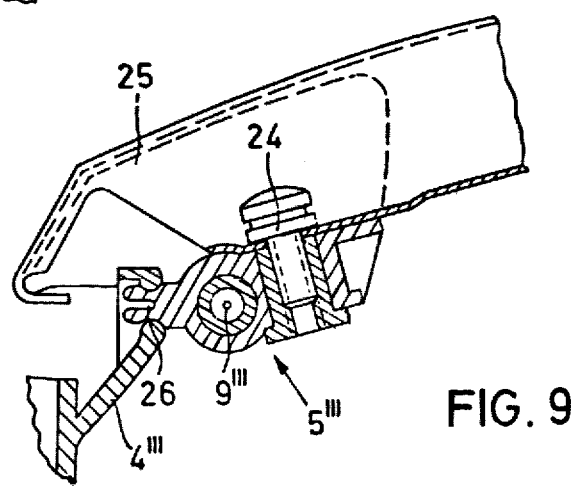
FIG. 9 shows a side elevation of the mounting means in FIG. 8 in the direction of the arrow IX.

A further embodiment of the mounting part is shown in FIGS. 8 an 9. A flashing lamp 1''' in this case exhibits an arm 4''' which is braced through an articulated catch connection 26 to a mounting part 5''' which is attached to a flange 8''' of the body. The mounting part 5''' is attached through a screw bolt 24 to the flange 8''', while the mounting part 5''' is aligned with reference to the mudguard and braced by an integrally moulded guide plate 25.

Mounting part 5'''' again exhibits a ball socket 9''' which accommodates a ball head 7''' of the upper pivotally movable mounting point P. The catch connection of flashing lamp 1''' to mounting part 5''' is made somewhat articulated and thereby prevents stressing of the flashing lamp housing. Furthermore, an independent assembly of the headlamp and of the flashing lamp may be made to mounting part 5''' aligned and anchored towards the shell of the body.

Various modifications and variations will no doubt occur to those skilled in the various arts to which this invention pertains. For example, the mounting part can be constructed as a screw threaded mounting part as well as in various clip and catch mounting constructions which permit a reliable mounting of the flashing lamp and of the headlamp with a favorable mutual alignment of the two components with each other. These and all other variations which basically rely on the teachings through which this disclosure has advanced the art are properly considered within the scope of this invention.

I claim:

1. A motor vehicle flashing lamp and headlamp fixture for a motor vehicle body including:
    a flashing lamp housing and a headlamp positioned in side by side relationship in a laterally extending vehicle body aperture,
    a support arm extending from the rear of the flashing lamp housing to a part of the vehicle body adjacent one end of the vehicle body aperture,
    a swivel means interposed between the support arm and the headlamp to provide an upper swivel point about which the headlamp is freely pivotal relative to the flashing lamp housing, a lower adjusting device supported on the flashing lamp housing having a first linearly movable adjusting screw means having a first ball and socket connection to the headlamp, and an upper adjusting device supported on the vehicle body adjacent the other end of the vehicle body aperture having a second linearly movable adjusting screw means having a second ball and socket connection to the headlamp, the first linearly adjustable screw means being movable to tilt the headlamp upwardly or downwardly about a horizontal adjusting axis passing through the upper swivel point and the second ball and socket connection to adjust the illumination range of the headlamp, and the second linearly adjustable screw means being movable to tilt the headlamp about a substantially vertical axis passing through the upper swivel point and the first ball and socket connection to adjust the illumination direction of the headlamp.

2. A motor vehicle flashing lamp and headlamp fixture as recited in claim 1 wherein said lower adjusting device is attached to the body through a guide bracket slidable on said flashing lamp.

3. A motor vehicle flashing lamp and headlamp fixture as recited in claim 1 wherein said flashing lamp housing support arm is attached to said body by a screw bolt for tensioning said support arm against a flange of the body, the free end of said screw bolt including a first mating means such as a ball head or a ball socket to receive a coacting second mating bearing means to provide the swivel means for said headlamp.

4. A motor vehicle flashing lamp and headlamp fixture as recited in claim 3 wherein said second mating bearing means of said swivel means for said headlamp is positioned inside said headlamp.

5. A motor vehicle flashing lamp and headlamp fixture as recited in claim 3 wherein said second mating bearing means of said swivel means for said headlamp is positioned forwards of the headlamp reflector.

6. A motor vehicle flashing lamp and headlamp fixture as recited in claim 3 wherein said support arm is constructed as a clip or clamp mounting means in the flange of the body.

7. A motor vehicle flashing lamp and headlamp fixture as recited in claim 3 wherein said support arm is constructed as a component provided with a guide plate which is fixed to the flange of the body aligned with respect to the body by a screw bolt independently of said flashing lamp and of said headlamp and includes a catch connection for said flashing lamp and a ball socket to receive the ball head of said second mating bearing means.

* * * * *